(12) United States Patent
Govari (10) Patent No.: US 12,539,064 B2
(45) Date of Patent: Feb. 3, 2026

(54) PACING INDUCED ELECTRICAL ACTIVATION GRADING

(71) Applicant: BIOSENSE WEBSTER (ISRAEL) LTD., Yokneam (IL)

(72) Inventor: Assaf Govari, Haifa (IL)

(73) Assignee: Biosense Webster (Israel) Ltd., Yokneam (IL)

( * ) Notice: Subject to any disclaimer, the term of this patent is extended or adjusted under 35 U.S.C. 154(b) by 725 days.

(21) Appl. No.: 17/969,137

(22) Filed: Oct. 19, 2022

(65) Prior Publication Data

US 2023/0043978 A1 Feb. 9, 2023

Related U.S. Application Data

(63) Continuation of application No. 16/826,423, filed on Mar. 23, 2020, now abandoned.

(51) Int. Cl.
*A61B 5/287* (2021.01)
*A61B 5/06* (2006.01)
*A61B 5/316* (2021.01)
*A61B 5/339* (2021.01)
*A61N 1/05* (2006.01)
*A61N 1/37* (2006.01)
*A61B 5/00* (2006.01)

(52) U.S. Cl.
CPC ............. *A61B 5/287* (2021.01); *A61B 5/068* (2013.01); *A61B 5/316* (2021.01); *A61B 5/339* (2021.01); *A61N 1/056* (2013.01); *A61N 1/371* (2013.01); *A61B 5/6859* (2013.01); *A61B 2562/0209* (2013.01)

(58) Field of Classification Search
CPC .......... A61B 5/287; A61B 5/339; A61B 5/316
USPC ......................................................... 600/509
See application file for complete search history.

(56) References Cited

U.S. PATENT DOCUMENTS

| 5,391,199 A | 2/1995 | Ben Haim |
|---|---|---|
| 6,239,724 B1 | 5/2001 | Doron |
| 6,332,089 B1 | 12/2001 | Acker |
| | (Continued) | |

FOREIGN PATENT DOCUMENTS

WO    WO1996005768 A1    2/1996

OTHER PUBLICATIONS

Extended European Search Report, received for European Application No. 21163919.0, mailed on Sep. 8, 2021, 7 pages.

*Primary Examiner* — Nadia A Mahmood (57) ABSTRACT

In one embodiment, a medical procedure system includes a probe for insertion into a chamber of a heart of a living subject, and including a first electrode to apply a sequence of pacing pulses at a position in the chamber, a second electrode to sense an electrical activation signal responsively to electrical activations induced by capture of the pacing pulses in a myocardium of the chamber, a display, and processing circuitry to evaluate a successful acquisition by the second electrode of the induced electrical activations responsively to the electrical activation signal, the successful acquisition being indicative of a successful capture of the pacing pulses by the myocardium, compute a capture grade responsively to the evaluation of the successful acquisition of the induced electrical activations, the capture grade being indicative of a count of the induced electrical activations evaluated as being successfully acquired, and render the capture grade to the display.

21 Claims, 5 Drawing Sheets

(56) References Cited

U.S. PATENT DOCUMENTS

| | | |
|---|---|---|
| 6,484,118 B1 | 11/2002 | Govari |
| 6,618,612 B1 | 9/2003 | Acker |
| 6,690,963 B2 | 2/2004 | Ben Haim |
| 7,756,576 B2 | 7/2010 | Levin |
| 7,848,787 B2 | 12/2010 | Osadchy |
| 7,869,865 B2 | 1/2011 | Govari |
| 9,560,980 B2 | 2/2017 | Charlton |
| 10,092,761 B2 | 10/2018 | An |
| 10,314,502 B2 | 6/2019 | Peterson |
| 11,484,359 B2 | 11/2022 | Berman et al. |
| 2002/0006455 A1 | 1/2002 | Levine |
| 2003/0120150 A1 | 6/2003 | Govari |
| 2004/0068178 A1 | 4/2004 | Govari |
| 2006/0293717 A1 | 12/2006 | Sathaye et al. |
| 2009/0253976 A1* | 10/2009 | Harlev .............. A61B 5/343 606/41 |
| 2010/0198292 A1 | 8/2010 | Honeck |
| 2010/0198295 A1 | 8/2010 | Sheldon et al. |
| 2011/0184274 A1 | 7/2011 | Rosenberg et al. |
| 2016/0166166 A1 | 6/2016 | Bunch |
| 2018/0235537 A1 | 8/2018 | Whiting |
| 2019/0134404 A1 | 5/2019 | Sheldon et al. |
| 2019/0374781 A1 | 12/2019 | Stadler et al. |
| 2021/0290094 A1 | 9/2021 | Govari |

\* cited by examiner

PACING INDUCED ELECTRICAL ACTIVATION GRADING

CROSS-REFERENCE TO RELATED APPLICATION

This application is a continuing application of U.S. application Ser. No. 16/826,423, filed Mar. 23, 2020.

FIELD OF THE INVENTION

The present invention relates to medical systems, and in particular, but not exclusively, to electrical activation for medical procedures.

BACKGROUND

A wide range of medical procedures involve placing probes, such as catheters, within a patient's body. Location sensing systems have been developed for tracking such probes. Magnetic location sensing is one of the methods known in the art. In magnetic location sensing, magnetic field generators are typically placed at known locations external to the patient. A magnetic field sensor within the distal end of the probe generates electrical signals in response to these magnetic fields, which are processed to determine the coordinate locations of the distal end of the probe. These methods and systems are described in U.S. Pat. Nos. 5,391,199, 6,690,963, 6,484,118, 6,239,724, 6,618,612 and 6,332,089, in PCT International Publication No. WO 1996/005768, and in U.S. Patent Application Publications Nos. 2002/006455 and 2003/0120150 and 2004/0068178. Locations may also be tracked using impedance or current based systems.

One medical procedure in which these types of probes or catheters have proved extremely useful is in the treatment of cardiac arrhythmias. Cardiac arrhythmias and atrial fibrillation in particular, persist as common and dangerous medical ailments, especially in the aging population.

Diagnosis and treatment of cardiac arrhythmias include mapping the electrical properties of heart tissue, especially the endocardium and the heart volume, and selectively ablating cardiac tissue by application of energy. Such ablation can cease or modify the propagation of unwanted electrical signals from one portion of the heart to another. The ablation process destroys the unwanted electrical pathways by formation of non-conducting lesions. Various energy delivery modalities have been disclosed for forming lesions, and include use of microwave, laser and more commonly, radiofrequency energies to create conduction blocks along the cardiac tissue wall. In a two-step procedure, mapping followed by ablation, electrical activity at points within the heart is typically sensed and measured by advancing a catheter containing one or more electrical sensors into the heart, and acquiring data at a multiplicity of points. These data are then utilized to select the endocardial target areas at which the ablation is to be performed.

Electrode catheters have been in common use in medical practice for many years. They are used to stimulate and map electrical activity in the heart and to ablate sites of aberrant electrical activity. In use, the electrode catheter is inserted into a major vein or artery, e.g., femoral artery, and then guided into the chamber of the heart of concern. A typical ablation procedure involves the insertion of a catheter having a one or more electrodes at its distal end into a heart chamber. A reference electrode may be provided, generally taped to the skin of the patient or by means of a second catheter that is positioned in or near the heart. RF (radio frequency) current is applied to the tip electrode(s) of the ablating catheter, and current flows through the media that surrounds it, i.e., blood and tissue, toward the reference electrode. The distribution of current depends on the amount of electrode surface in contact with the tissue as compared to blood, which has a higher conductivity than the tissue. Heating of the tissue occurs due to its electrical resistance. The tissue is heated sufficiently to cause cellular destruction in the cardiac tissue resulting in formation of a lesion within the cardiac tissue which is electrically non-conductive.

US Patent Publication 2018/0235537 describes a system for assigning zone rankings to a patient. The system includes a processor, at least one database, and a computer readable medium in communication with the at least one database and comprising one or more instructions that, when executed, can cause the processor to receive at least one physiological signal from a medical monitoring device that is worn by a patient; assign a normal zone ranking to the patient based upon historical patient data stored on the at least one database; determine one or more metrics from the at least one physiological signal of the patient; assign a first zone ranking to the patient based upon the one or more metrics, the first zone ranking selected from a plurality of abnormal zone rankings stored on the at least one database; determine one or more actions to initiate based upon the assigned first zone ranking; and initiate the one or more determined actions.

U.S. Pat. No. 9,560,980 to Charlton, et al., describes an implantable medical device (IMD) that is implanted in a patient. The IMD uses a plurality of electrode vectors to generate intrathoracic impedance measurements. The intrathoracic impedance measurements can be indicative of amounts of intrathoracic fluid in the patient. An accumulation of intrathoracic fluid may indicate that the patient is at an increased risk of experiencing a heart failure event in the near future. The IMD performs a vector selection operation on a recurring basis. When the IMD performs the vector selection operation, the IMD uses impedance measurements to select one of the electrode vectors. The IMD can perform a risk assessment operation on another recurring basis. During performance of the risk assessment operation, the IMD uses impedance measurements of the selected electrode vector and/or other patient characteristics stored within the IMD to determine whether the patient is at an increased risk of experiencing a heart failure event.

U.S. Pat. No. 10,314,502 to Peterson, et al., describes systems and methods for evaluating multiple candidate sensing vectors for use in sensing electrical activity of a heart. The system can sense physiologic signals using each of a plurality of candidate sensing vectors, and generate respective signal intensity indicators and interference indicators using the physiologic signals sensed by using the respective sensing vectors. The system can also receive electrode information of each of the candidate sensing vectors, including information about sensing electrodes that are also used for delivering cardiac electrostimulation. The system can rank at least some of the plurality of candidate sensing vectors according to the signal intensity indicators, the interference indicators, and the electrode information. The system can also include a user interface for displaying the ranked sensing vectors, and allowing the user to select at least one sensing vector for use in sensing the cardiac electrical activity.

U.S. Pat. No. 10,092,761 to An, et al., describes systems and methods for evaluating multiple candidate electrostimulation vectors for use in therapeutic cardiac stimulation. The system can include a programmable electrostimulator circuit for delivering electrostimulation to one or more sites of a heart according to multiple candidate electrostimulation vectors. One or more physiologic sensors can detect resulting physiologic responses to the electrostimulation. A processor circuit can generate categories of indicators including therapy efficacy indicators, battery longevity indicators, or complication indicators using the sensed physiologic responses. The candidate electrostimulation vectors can be ranked according to the categories of indicators in specified orders. The system can include a user interface for displaying the ranked candidate electrostimulation vectors, and allowing the user to select one or more electrostimulation vectors and programming the electrostimulator circuit to deliver therapeutic electrostimulation to at least one site of the heart using the selected electrostimulation vectors.

US Patent Publication 2010/0198292 to Honeck, et al., describes techniques including delivering cardiac pacing therapy from a medical device to a chamber of a heart via a first electrode configuration and determining that the delivery of cardiac pacing therapy via the first electrode configuration inadequately captures the chamber. In response to such a determination, the medical device delivers cardiac pacing therapy to the chamber of the heart via a plurality of additional electrode configurations. The techniques further comprise determining a capture characteristic for each of the additional electrode configurations based on the delivery of cardiac pacing therapy to the chamber of the heart via the plurality of other electrode configurations. A new electrode configuration for cardiac pacing may be selected based on the capture characteristics of the various electrode configurations.

US Patent Publication 2016/0166166 to Bunch, et al., describes methods for treating cardiac complex rhythm disorder in a patient including receiving a plurality of electrical signals from a sensor system, wherein each electrical signal corresponds with a separate location on a cardiac wall of the heart of the patient, and wherein each electrical signal comprises an electrogram waveform; and ranking the electrical signals relative to each other based on at least a uniformity and a frequency of the electrogram waveform of each electrical signal.

SUMMARY

There is provided in accordance with an embodiment of the present invention, a medical procedure system, including a probe configured for insertion into a chamber of a heart of a living subject, and including a first electrode configured to apply a sequence of pacing pulses at a position in the chamber, a second electrode configured to sense an electrical activation signal responsively to electrical activations induced by capture of the pacing pulses in a myocardium of the chamber over time, a display, and processing circuitry configured to evaluate a successful acquisition by the second electrode of the induced electrical activations responsively to the electrical activation signal, the successful acquisition being indicative of a successful capture of the pacing pulses by the myocardium, compute a capture grade responsively to the evaluation of the successful acquisition of the induced electrical activations, the capture grade being indicative of a count of the induced electrical activations which were evaluated as being successfully acquired, and render the capture grade to the display.

Further in accordance with an embodiment of the present invention the processing circuitry is configured to evaluate the successful acquisition by the second electrode of respective ones of the electrical activations induced by respective ones of the pacing pulses responsively to the electrical activation signal exceeding a threshold signal amplitude within a given time window after the respective pacing pulses.

Still further in accordance with an embodiment of the present invention the processing circuitry is configured to compute the capture grade responsively to a count of the induced electrical activations evaluated as being successfully acquired by the second electrode.

Additionally, in accordance with an embodiment of the present invention the processing circuitry is configured to compute the capture grade also responsively to a count of unacquired electrical activations.

Moreover, in accordance with an embodiment of the present invention the processing circuitry is configured to compute the capture grade also responsively to a total count of the pacing pulses.

Further in accordance with an embodiment of the present invention the processing circuitry is configured to compute the capture grade responsively to a count of unacquired electrical activations and a total count of the pacing pulses.

Still further in accordance with an embodiment of the present invention, the system includes a pacing unit configured to generate the pacing pulses for application by the first electrode.

Additionally, in accordance with an embodiment of the present invention the processing circuitry is configured to render to the display the capture grade with a representation of the electrical activation signal.

Moreover, in accordance with an embodiment of the present invention the processing circuitry is configured to track a location of the second electrode.

Further in accordance with an embodiment of the present invention the processing circuitry is configured to render to the display a representation of another probe responsively to the tracked location.

There is also provided in accordance with another embodiment of the present invention, a medical procedure method including inserting a first probe into a chamber of a heart of a living subject, applying with a first electrode of the first probe a sequence of pacing pulses at a position in the chamber, sensing with a second electrode an electrical activation signal responsively to electrical activations induced by capture of the pacing pulses in a myocardium of the chamber over time, evaluating a successful acquisition by the second electrode of the induced electrical activations responsively to the electrical activation signal, the successful acquisition being indicative of a successful capture of the pacing pulses by the myocardium, computing a capture grade responsively to the evaluation of the successful acquisition of the induced electrical activations, the capture grade being indicative of a count of the induced electrical activations which were evaluated as being successfully acquired, and rendering the capture grade to a display.

Still further in accordance with an embodiment of the present invention the evaluating includes evaluating the successful acquisition by the second electrode of respective ones of the electrical activations induced by respective ones of the pacing pulses responsively to the electrical activation signal exceeding a threshold signal amplitude within a given time window after the respective pacing pulses.

Additionally, in accordance with an embodiment of the present invention the computing includes computing the capture grade responsively to a count of the induced electrical activations evaluated as being successfully acquired by the second electrode.

Moreover, in accordance with an embodiment of the present invention the computing also includes computing the capture grade also responsively to a count of unacquired electrical activations.

Further in accordance with an embodiment of the present invention the computing also includes computing the capture grade also responsively to a total count of the pacing pulses.

Still further in accordance with an embodiment of the present invention the computing includes computing the capture grade responsively to a count of unacquired electrical activations and a total count of the pacing pulses.

Additionally, in accordance with an embodiment of the present invention, the method includes generating the pacing pulses for application by the first electrode.

Moreover, in accordance with an embodiment of the present invention the rendering includes rendering to the display the capture grade with a representation of the electrical activation signal.

Further in accordance with an embodiment of the present invention, the method includes tracking a location of the second electrode.

Still further in accordance with an embodiment of the present invention the rendering including rendering to the display a representation of another probe responsively to the tracked location.

BRIEF DESCRIPTION OF THE DRAWINGS

The present invention will be understood from the following detailed description, taken in conjunction with the drawings in which.

DETAILED DESCRIPTION OF EXEMPLARY EMBODIMENTS

Overview

Pacing signals may be used in mapping a cardiac chamber or in preparation for mapping a cardiac chamber or in preparation for other medical procedures. For example, pacing signals may be used to map conduction pathways and identify abnormal conduction pathways. Additionally, or alternatively, a physician may observe electrical activation signals (induced by pacing) and captured by a myocardium of the cardiac chamber to determine if the electrode(s) are reliably placed in the cardiac chamber. The reliability of electrode placement may refer to the placement of the electrode applying the pacing signals and/or the electrode sensing the electrical activity induced by the pacing signals. Once an electrode is determined to be reliably placed in the cardiac chamber, the electrode may then be used for mapping or for ablation, or any suitable medical procedure. However, visually analyzing the electrical activation signals is a detailed and lengthy process. This is especially critical during a medical procedure, for example, a cardiac procedure, where time is of the essence. Moreover, if the catheter includes multiple electrodes which could include tens or even hundreds of electrodes, the visual analysis task may become too onerous to perform effectively.

Exemplary embodiments of the present invention solve the above problems by providing a system that automatically evaluates the successful acquisition by an electrode of electrical activations induced by a sequence of pacing pulses responsively to the electrical activation signal. The successful acquisition is indicative of a successful capture of the pacing pulses by the myocardium. The system also computes a capture grade which is indicative of a count of the electrical activations which were evaluated as being successfully acquired. The capture grade provides a quantitative and/or descriptive measure of how well the electrode acquired the electrical activations and therefore a measure of how reliably the electrode is placed in the cardiac chamber and/or a measure of how well the myocardium captured the pacing pulses. For example, if one out of every five electrical activations is acquired, the score may be "low", or "poor", or "1", or "20%", and if four out of every five electrical activations is acquired the score may be "high", or "excellent", or "4", or "80%". The quantitative and/or descriptive measure provides the physician with an immediate evaluation of the reliability of the placement of the sensing electrode and/or the pacing application electrode without having to manually visually analyze the electrical activation signals. The above may be repeated for addition electrodes of a probe.

The quantitative and/or descriptive measure may be used by the physician to grade to the quality of an electrode for mapping (and/or pacing) so that the physician can map (and/or pace) with confidence or perform some other task such as determine quality of tissue contact for ablation.

In some exemplary embodiments, a medical procedure system includes a first probe which is inserted into a chamber of a heart of a living subject, and a second probe inserted into the chamber. In some exemplary embodiments the first and second probe may be combined into a single catheter. In some exemplary embodiments, the second probe may be replaced by one or more body surface electrodes to sense the electrical activation signal.

The system includes a pacing unit which generates a sequence of pacing pulses for application by a "first" electrode of the first probe at a position in the chamber (e.g., at the coronary sinus) to induce a corresponding sequence of electrical activations in the myocardium of the chamber over time. A "second" electrode (of the second probe) senses an electrical activation signal responsively to the sequence of electrical activations.

The system also includes processing circuitry which tracks a location of the second electrode. In some exemplary embodiments, the processing circuitry may also track the location of the first electrode and/or one or more addition electrodes of the second probe.

The processing circuitry evaluates a successful acquisition by the second electrode of the electrical activations responsively to the electrical activation signal. The successful acquisition is indicative of a successful capture of the pacing pulses by the myocardium This may be repeated for more electrodes of the second probe. In some exemplary embodiments, the processing circuitry evaluates the successful acquisition by the second electrode of respective ones of the electrical activations induced by respective ones of the pacing pulses responsively to the amplitude of the electrical activation signal exceeding a threshold signal amplitude within a given time window after the respective pacing pulses.

The processing circuitry computes a capture grade of the second electrode responsively to the evaluation of the successful acquisition of each of the electrical activations. The capture grade is indicative of a count of the electrical activations which were evaluated as being successfully acquired by the second electrode. This may also be repeated for other electrodes of the second probe. In some exemplary embodiments, the processing circuitry computes the capture grade responsively to a count of the induced electrical activations evaluated as being successfully acquired by the second electrode, and a count of unacquired electrical activations, or a total count of the pacing pulses. In other exemplary embodiments, the processing circuitry computes the capture grade responsively to a count of unacquired electrical activations and a total count of the pacing pulses.

The processing circuitry renders the capture grade to a display, which may also be rendered with a representation of the corresponding electrical activation signal. The processing circuitry may also render to the display a representation of the second probe responsively to the tracked location.

System Description

Figure 1:
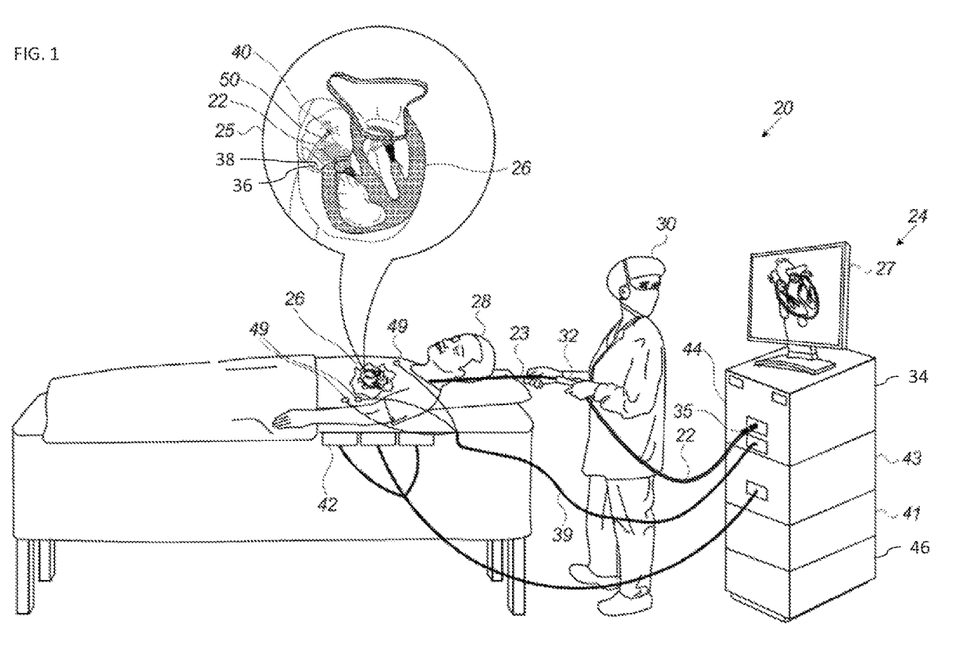
FIG. 1 is a schematic view of a medical procedure system constructed and operative in accordance with an exemplary embodiment of the present invention.
Figure 2:
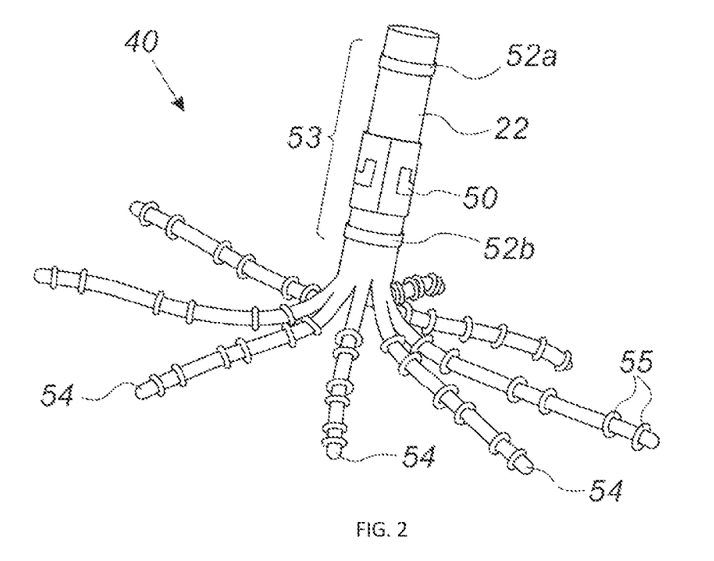
FIG. 2 is a schematic view of a catheter for use in the system of FIG. 1.

Reference is now made to FIG. 1, which is a schematic view of a medical procedure system 20 constructed and operative in accordance with an exemplary embodiment of the present invention. Reference is also made to FIG. 2, which is a schematic view of a catheter 40 for use in the system 20 of FIG. 1.

The medical procedure system 20 is used to determine the position of the catheter 40, seen in an inset 25 of FIG. 1 and in more detail in FIG. 2. The catheter 40 is a probe which includes a shaft 22 and a plurality of deflectable arms 54 (only some labeled for the sake of simplicity) for inserting into a body-part (e.g., chamber of a heart 26) of a living subject. The deflectable arms 54 have respective proximal ends connected to the distal end of the shaft 22.

The catheter 40 includes a position sensor 53 disposed on the shaft 22 in a predefined spatial relation to the proximal ends of the deflectable arms 54. The position sensor 53 may include a magnetic sensor 50 and/or at least one shaft electrode 52. The magnetic sensor 50 may include at least one coil, for example, but not limited to, a dual-axis or a triple axis coil arrangement to provide position data for location and orientation including roll. The catheter 40 includes multiple electrodes 55 (only some are labeled in FIG. 2 for the sake of simplicity) disposed at different, respective locations along each of the deflectable arms 54. Typically, the catheter 40 may be used for mapping electrical activity in a heart of the living subject using the electrodes 55, or for performing any other suitable function in a body-part of a living subject, for example, but not limited to, reversible and/or irreversible electroporation and/or RF ablation.

The medical procedure system 20 may determine a position and orientation of the shaft 22 of the catheter 40 based on signals provided by the magnetic sensor 50 and/or the shaft electrodes 52 (proximal-electrode 52a and distal-electrode 52b) fitted on the shaft 22, on either side of the magnetic sensor 50. The proximal-electrode 52a, the distal-electrode 52b, the magnetic sensor 50 and at least some of the electrodes 55 are connected by wires running through the shaft 22 via a catheter connector 35 to various driver circuitries in a console 24. In some exemplary embodiments, at least two of the electrodes 55 of each of the deflectable arms 54, the shaft electrodes 52, and the magnetic sensor 50 are connected to the driver circuitries in the console 24 via the catheter connector 35. In some exemplary embodiments, the distal-electrode 52b and/or the proximal electrode 52a may be omitted.

The illustration shown in FIG. 2 is chosen purely for the sake of conceptual clarity. Other configurations of shaft electrodes 52 and electrodes 55 are possible. Additional functionalities may be included in the position sensor 53. Elements which are not relevant to the disclosed exemplary embodiments of the invention, such as irrigation ports, are omitted for the sake of clarity.

A physician 30 navigates the catheter 40 to a target location in a body part (e.g., the heart 26) of a patient 28 by manipulating the shaft 22 using a manipulator 32 near the proximal end of the catheter 40 and/or deflection from a sheath 23. The catheter 40 is inserted through the sheath 23, with the deflectable arms 54 gathered together, and only after the catheter 40 is retracted from the sheath 23, the deflectable arms 54 are able to spread and regain their intended functional shape. By containing deflectable arms 54 together, the sheath 23 also serves to minimize vascular trauma on its way to the target location.

Console 24 comprises processing circuitry 41, typically a general-purpose computer and a suitable front end and interface circuits 44 for generating signals in, and/or receiving signals from, body surface electrodes 49 which are attached by wires running through a cable 39 to the chest and to the back, or any other suitable skin surface, of the patient 28.

Console 24 further comprises a magnetic-sensing subsystem. The patient 28 is placed in a magnetic field generated by a pad containing at least one magnetic field radiator 42, which is driven by a unit 43 disposed in the console 24. The magnetic field radiator(s) 42 is configured to transmit alternating magnetic fields into a region where the body-part (e.g., the heart 26) is located. The magnetic fields generated by the magnetic field radiator(s) 42 generate direction signals in the magnetic sensor 50. The magnetic sensor 50 is configured to detect at least part of the transmitted alternating magnetic fields and provide the direction signals as corresponding electrical inputs to the processing circuitry 41.

In some exemplary embodiments, the processing circuitry 41 uses the position-signals received from the shaft electrodes 52, the magnetic sensor 50 and the electrodes 55 to estimate a position of the catheter 40 inside an organ, such as inside a cardiac chamber. In some exemplary embodiments, the processing circuitry 41 correlates the position signals received from the electrodes 52, 55 with previously acquired magnetic location-calibrated position signals, to estimate the position of the catheter 40 inside the organ. The position coordinates of the shaft electrodes 52 and the electrodes 55 may be determined by the processing circuitry 41 based on, among other inputs, measured impedances, or on proportions of currents distribution, between the electrodes 52, 55 and the body surface electrodes 49. The console 24 drives a display 27, which shows the distal end of the catheter 40 inside the heart 26.

The method of position sensing using current distribution measurements and/or external magnetic fields is implemented in various medical applications, for example, in the Carto® system, produced by Biosense Webster Inc. (Irvine, California), and is described in detail in U.S. Pat. Nos. 5,391,199, 6,690,963, 6,484,118, 6,239,724, 6,618,612, 6,332,089, 7,756,576, 7,869,865, and 7,848,787, in PCT Patent Publication WO 96/05768, and in U.S. Patent Application Publications 2002/0065455 A1, 2003/0120150 A1 and 2004/0068178 A1.

The Carto®3 system applies an Active Current Location (ACL) impedance-based position-tracking method. In some exemplary embodiments, using the ACL method, the processing circuitry 41 is configured to create a mapping (e.g., current-position matrix (CPM)) between indications of electrical impedance and positions in a magnetic coordinate frame of the magnetic field radiator(s) 42. The processing circuitry 41 estimates the positions of the shaft electrodes 52 and the electrodes 55 by performing a lookup in the CPM.

Other methods of determining the location of the distal end of the catheter may be used, for example, based on ultrasonic transducers and receivers, using imaging techniques such as ultrasound or MRI or CT scans which may include disposing radiopaque tags on the catheter 40.

Processing circuitry 41 is typically programmed in software to carry out the functions described herein. The software may be downloaded to the computer in electronic form, over a network, for example, or it may, alternatively or additionally, be provided and/or stored on non-transitory tangible media, such as magnetic, optical, or electronic memory.

FIG. 1 shows only elements related to the disclosed techniques, for the sake of simplicity and clarity. The system 20 typically comprises additional modules and elements that are not directly related to the disclosed techniques, and thus are intentionally omitted from FIG. 1 and from the corresponding description.

The catheter 40 described above includes eight deflectable arms 54 with six electrodes 55 per arm 54. Any suitable catheter may be used instead of the catheter 40, for example, a catheter with a different number of flexible arms and/or electrodes per arm, or a different probe shape such as a balloon catheter or a lasso catheter, by way of example only.

The medical procedure system 20 may also perform electroporation or RF ablation (or other ablation technique) of heart tissue using any suitable catheter, for example using the catheter 40 or a different catheter and any suitable ablation method. The console 24 may include a signal generator 34 configured to generate an electrical signal to be applied by an electrode or electrodes of a catheter connected to the console 24, (and optionally one or more of the body surface electrodes 49), to perform electroporation or RF ablation of a myocardium of the heart 26. The console 24 may include a pump (not shown), which pumps irrigation fluid into an irrigation channel to a distal end of a catheter performing RF ablation. The catheter performing the RF ablation may also include temperature sensors (not shown) which are used to measure a temperature of the myocardium during RF ablation and regulate an ablation power and/or an irrigation rate of the pumping of the irrigation fluid according to the measured temperature.

The system 20 may also include a probe 36 which is also configured for insertion into the chamber of the heart 26, and comprising an electrode 38. The probe 36 may be implemented as part of the catheter 40 or as part of a different catheter. The system 20 also includes a pacing unit 46 disposed in the console 24, and configured to generate a sequence of pacing pulses for application by the electrode 38 as described in more detail with reference to FIGS. 3-6.

Figure 3:
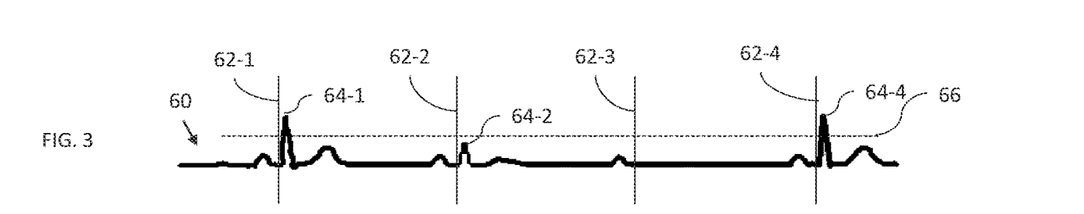
FIG. 3 is a schematic view of an intracardiac electrogram generated by the system of FIG. 1.

Reference is now made to FIG. 3, which is a schematic view of an intracardiac electrogram 60 generated by the system 20 of FIG. 1. The intracardiac electrogram 60 has been annotated to show the timing of pacing pulses 62 which were applied to the myocardium in order to induce electrical activations of the myocardium shown as peaks 64 of the signal. The intracardiac electrogram 60 includes two large peaks 64-1, 64-4 following the pacing pulses 62-1, 62-4, respectively. The peaks 64-1, 64-4 exceed a threshold signal amplitude 66. The peak 64-2 following the pacing pulse 62-2 is much smaller than the large peaks 64-1, 64-4, and is less than the threshold signal amplitude 66. There is no peak following the pacing pulse 62-3. Therefore, out of the four pacing pulses 62 two electrical activations were acquired by the electrode 55 (FIG. 2) that provided the intracardiac electrogram 60. The electrode 55 may be assigned a capture grade of 50%, or (2 out of 4), or "fair". Another one of the electrodes may acquire 4 electrical activations and could be given a capture grade of 100%, or (4 out of 4), or "excellent", for example. If one electrode has a capture grade of 100% that implies that all of the pacing pulses were captured by the myocardium of the heart and the other electrode which has a capture grade of 50% failed to acquire some of the electrical activations due to bad placement of that electrode.

Figure 4:
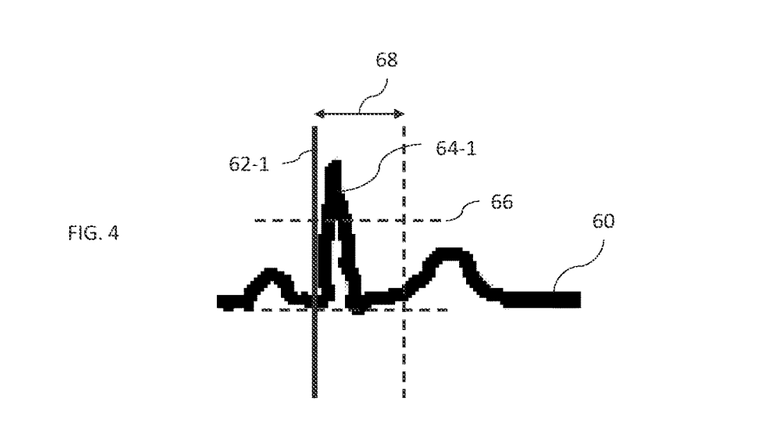
FIG. 4 is a schematic view of part of the intracardiac electrogram of FIG. 3.

Reference is now made to FIG. 4, which is a schematic view of part of the intracardiac electrogram 60 of FIG. 3 showing the peak 64-1 following the pacing pulse 62-1. The processing circuitry 41 (FIG. 1) is configured to evaluate the successful acquisition by a given electrode 55 (FIG. 2) of an electrical activation induced by a corresponding pacing pulse 62-1 responsively to the electrical activation signal (e.g., the intracardiac electrogram 60) exceeding the threshold signal amplitude 66 within a given time window 68 after the pacing pulse 62-1. FIG. 4 shows that the intracardiac electrogram 60 exceeds the threshold signal amplitude 66 within the time window 68. The time window 68 may have any suitable value for example, in the range of 0.04 to 0.3 seconds. The threshold signal amplitude 66 may have any suitable amplitude, for example, in the range of 0.5 to 1.5 mV.

Figure 5:
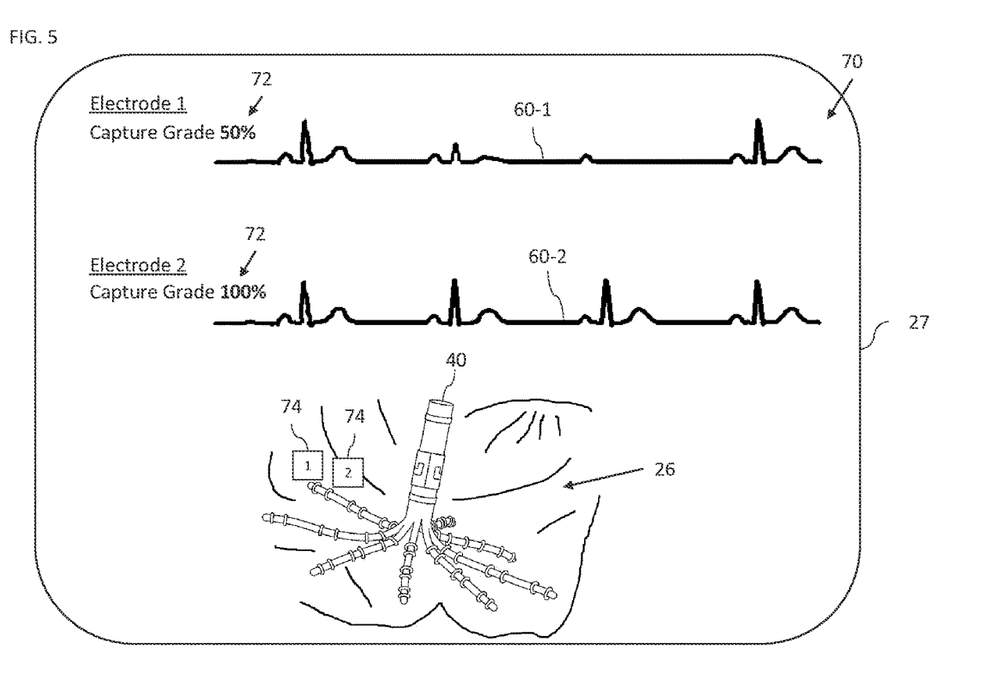
FIG. 5 is a schematic view of a user interface generated by the system of FIG. 1.

Reference is now made to FIG. 5, which is a schematic view of a user interface 70 generated by the system 20 of FIG. 1. FIG. 5 shows two intracardiac electrograms 60-1, 60-2, sensed by two respective ones of the electrodes 55 (FIG. 2), rendered on the display 27. Alongside each intracardiac electrogram 60-1, 60-2, a respective capture grade 72 is displayed. The intracardiac electrogram 60-1 shows that two electrical activations above threshold were acquired by the respective electrode 55, and is therefore assigned a capture grade 72 of 50%. The intracardiac electrogram 60-2 shows that four electrical activations above threshold were acquired by the electrodes 55, and is therefore assigned a capture grade 72 of 100%. FIG. 5 also shows a representation of the catheter 40 inside the chamber of the heart 26 with two of the electrodes marked using annotations 74, showing the numbers assigned to each electrode.

Figure 6:
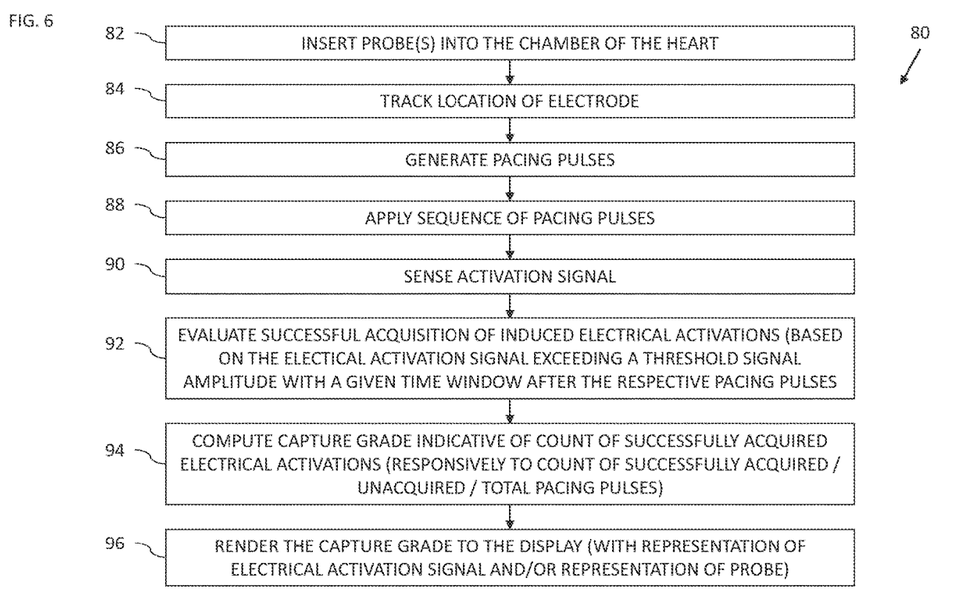
FIG. 6 is a flowchart including steps in a method of operation of the medical procedure system of FIG. 1.

Reference is now made to FIG. 6, which is a flowchart 80 including steps in a method of operation of the medical procedure system 20 of FIG. 1. Reference is also made to FIG. 1. The physician 30 inserts (block 82) the probe 36 into a chamber of the heart 26 of a living subject (e.g., the patient 28). The physician 30 also inserts (block 82) another probe (e.g., part of the catheter 40) into the chamber. In the description below the other probe is referred to as the catheter 40 for the sake of clarity. The probe 36 may be implemented as part of the catheter 40 or as part of a different catheter. In some exemplary embodiments, instead of inserting another probe, the physician 30, applies one or more body surface electrodes to a tissue surface of the patient 28.

The processing circuitry 41 is optionally configured to track (block 84) a location of one of the electrodes 55 (FIG. 2) (referred to as "the electrode 55" hereinbelow). The processing circuitry 41 may track the location of the electrode 55 using any suitable position tracking method, for example, one of the methods described above with reference to FIG. 1. The processing circuitry 41 may optionally track the location of other ones of the electrodes 55 and/or the electrode 38 of the probe 36.

The pacing unit 46 is configured to generate (block 86) the pacing pulses for application by the electrode 38 of the probe 36. In response, the electrode 38 is configured to apply (block 88) a sequence of pacing pulses 62 (FIG. 3) at a position in the chamber to induce a corresponding sequence of electrical activations in a myocardium of the chamber over time. The electrode 55 of the catheter 40 (or a body surface electrode) is configured to sense (block 90) an electrical activation signal 60 (FIG. 3) responsively to electrical activations induced by capture of the pacing pulses in a myocardium of the chamber over time. Other electrodes 55 of the catheter 40 may also be configured to sense respective electrical activation signals responsively to electrical activations induced by capture of the pacing pulses in the myocardium of the chamber over time.

The processing circuitry 41 is configured to evaluate (block 92) a successful acquisition by the electrode 55 (or the body surface electrode) of the induced electrical activations responsively to the electrical activation signal 60. In some exemplary embodiments, the processing circuitry 41 is configured to evaluate the successful acquisition by the electrode 55 of respective ones of the electrical activations induced by respective ones of the pacing pulses 62 responsively to an amplitude of the electrical activation signal 60 exceeding a threshold signal amplitude 66 (FIG. 4) within a given time window 68 (FIG. 4) after the respective pacing pulses 62. The above step may also be performed for the respective electrical activation signals of other respective ones of the electrodes 55.

The processing circuitry 41 is configured to compute (block 94) a capture grade 72 (FIG. 5) for the electrode 55 (or the body surface electrode) responsively to the evaluation of the successful acquisition of the induced electrical activations by the electrode 55. The capture grade is generally indicative of a count of the induced electrical activations which were evaluated as being successfully acquired by the electrode 55. The step of block 94 may be repeated for other electrodes 55 of the catheter 40. The capture grade may be computed based on the count of: the successful acquisitions of electrical activations and unacquired electrical activations (where they are expected to occur, e.g. within a time window after each pacing pulse); or the successful acquisitions of electrical activations and the total count of the pacing pulses; or the unacquired electrical activations and the total count of pacing pulses. Therefore, the processing circuitry 41 may be configured to compute the capture grade responsively to a count of the induced electrical activations evaluated as being: successfully acquired by the electrode 55; and not acquired by the electrode 55 or responsively to a total count of the pacing pulses. In some exemplary embodiments, the processing circuitry 41 is configured to compute the capture grade responsively to a count of the unacquired electrical activations and a total count of the pacing pulses. The capture grade may be expressed as a quantitative measure such as a score or a percentage of the successful acquisitions out of the total number of electrical activations or as a descriptive grade, e.g., "very poor" if the capture grade is 20% or less, "poor" if the capture grade is greater than or equal to 20% but less than 40%, "fair" if the capture grade is greater than or equal to 40% but less than 60%, "good" if the capture grade is greater than or equal to 60% but less than 80%, and "excellent" if the capture grade is greater than 80%. The descriptions and the associated ranges are provided by way of example only, and any suitable descriptions and associated ranges may be used.

The processing circuitry 41 is configured to render (block 96) the capture grade 72 to the display 27 as shown in FIG. 5. In some exemplary embodiments, the processing circuitry 41 is configured to render to the display 27 the capture grade 72 with a representation of the electrical activation signal 60 as shown in FIG. 5. In some embodiments, the processing circuitry 41 is configured to render to the display 27 a representation of the catheter 40 responsively to the tracked location(s). Respective capture grades 72 and optionally respective intracardiac electrograms 60 of respective electrodes 55 may be rendered to the display 27. The catheter 40 may be rendered to the display 27 with annotations 74 (FIG. 5) which indicate the electrode numbers assigned to the electrodes 55.

As used herein, the terms "about" or "approximately" for any numerical values or ranges indicate a suitable dimensional tolerance that allows the part or collection of components to function for its intended purpose as described herein. More specifically, "about" or "approximately" may refer to the range of values ±20% of the recited value, e.g. "about 90%" may refer to the range of values from 72% to 108%.

Various features of the present invention which are, for clarity, described in the contexts of separate embodiments may also be provided in combination in a single exemplary embodiment. Conversely, various features of the invention which are, for brevity, described in the context of a single embodiment may also be provided separately or in any suitable sub-combination.

The embodiments described above are cited by way of example, and the present invention is not limited by what has been particularly shown and described hereinabove. Rather the scope of the invention includes both combinations and subcombinations of the various features described hereinabove, as well as variations and modifications thereof which would occur to persons skilled in the art upon reading the foregoing description and which are not disclosed in the prior art.

What is claimed is:

1. A processing circuitry for controlling a medical procedure system, wherein processing circuitry is configured to:
    deliver pacing pulses to a first electrode mounted on a distal end of a first catheter;
    sample output from each of a plurality of second electrodes concurrently with the delivery of the pacing pulses, wherein the plurality of second electrodes is mounted on the distal end of the first catheter or at a distal end of a second catheter and is configured to be positioned against myocardium of the chamber;
    identify from the plurality of second electrodes, selected electrodes that captured a predefined number of electrical activations from the myocardium based on the output sampled, wherein the processing circuity is configured to determine that an electrical activation was captured based on the output sampled exceeding a signal amplitude threshold within a given time window after delivery of one of the pacing pulses;
    render on a display, a graphical representation of the plurality of second electrodes mounted on the distal end of one of the first or second catheter; and render an indication on the graphical representation that identifies the selected electrodes.

2. The processing circuitry according to claim 1, wherein the predefined number of electrical activations is less than the number of pacing pulses delivered.

3. The processing circuitry according to claim 1 further configured to track location of at least one from the plurality of second electrodes.

4. The processing circuitry according to claim 1 further configured to render a graphical representation of the position of the plurality of second electrodes inside the chamber of the heart.

5. The processing circuitry according to claim 1 further configured to identify that the first electrode is operatively positioned against myocardium of the chamber for pacing based on the output sampled.

6. The processing circuitry according to claim 1 further configured to:
sample second output from the selected electrodes; and
generate a map of the chamber with the second outputs.

7. The processing circuitry according to claim 1, further configured to selectively deliver energy for ablating the myocardium to the selected electrodes.

8. A method for controlling medical procedure system, the method comprising:
delivering pacing pulses to a first electrode mounted on a distal end of a first catheter;
sampling output from each of a plurality of second electrodes concurrently with the delivery of the pacing pulses, wherein the plurality of second electrodes is mounted on the distal end of the first catheter or at a distal end of a second catheter and is configured to be positioned against myocardium of the chamber;
identifying from the plurality of second electrodes, selected electrodes that captured a predefined number of electrical activations from the myocardium based on the output sampled, wherein determining that an electrical activation was captured based on the output sampled exceeding a signal amplitude threshold within a given time window after delivery of one of the pacing pulses;
rendering on a display, a graphical representation of the plurality of second electrodes mounted on the distal end of one of the first or second catheter; and
rendering an indication on the graphical representation that identifies the selected electrodes.

9. The method according to claim 8, wherein the predefined number of electrical activations is less than the number of pacing pulses delivered.

10. The method according to claim 8, wherein the plurality of second electrodes is mounted on the distal end of the second catheter and wherein the second catheter is dedicated for mapping electrical activation in the chamber.

11. The method according to claim 8, further comprising tracking location of at least one from the plurality of second electrodes.

12. The method according to claim 8, further comprising rendering a graphical representation of the position of the plurality of second electrodes inside the chamber of the heart.

13. The method according to claim 8, further comprising identifying that the first electrode is operatively positioned for pacing based on the output sampled.

14. The method according to claim 8, further comprising:
sampling second output from the selected electrodes; and
generating a map of the chamber with the second outputs.

15. The method according to claim 8, further comprising selectively delivering energy for ablating the myocardium to the selected electrodes.

16. A processing circuitry for controlling a medical procedure system, wherein processing circuitry is configured to:
deliver pacing pulses to a first electrode mounted on a distal end of a first catheter;
sample output from each of a plurality of second electrodes concurrently with the delivery of the pacing pulses, wherein the plurality of second electrodes is mounted on the distal end of the first catheter or at a distal end of a second catheter and is configured to be positioned against myocardium of the chamber;
identify from the plurality of second electrodes, selected electrodes that captured a predefined number of electrical activations from the myocardium based on the output sampled, wherein the predefined number of electrical activations is less than the number of pacing pulses delivered;
render on a display, a graphical representation of the plurality of second electrodes mounted on the distal end of one of the first or second catheter; and
render an indication on the graphical representation that identifies the selected electrodes.

17. The processing circuitry according to claim 16 further configured to identify that the first electrode is operatively positioned against myocardium of the chamber for pacing based on the output sampled.

18. The processing circuitry according to claim 16 further configured to:
sample second output from the selected electrodes; and
generate a map of the chamber with the second outputs.

19. A method for controlling medical procedure system, the method comprising:
delivering pacing pulses to a first electrode mounted on a distal end of a first catheter;
sampling output from each of a plurality of second electrodes concurrently with the delivery of the pacing pulses, wherein the plurality of second electrodes is mounted on the distal end of the first catheter or at a distal end of a second catheter and is configured to be positioned against myocardium of the chamber;
identifying from the plurality of second electrodes, selected electrodes that captured a predefined number of electrical activations from the myocardium based on the output sampled, wherein the predefined number of electrical activations is less than the number of pacing pulses delivered;
rendering on a display, a graphical representation of the plurality of second electrodes mounted on the distal end of one of the first or second catheter; and
rendering an indication on the graphical representation that identifies the selected electrodes.

20. The method according to claim 19, further comprising identifying that the first electrode is operatively positioned for pacing based on the output sampled.

21. The method according to claim 19, further comprising:
sampling second output from the selected electrodes; and
generating a map of the chamber with the second outputs.

* * * * *